Sept. 6, 1966     R. B. P. CRAWFORD ETAL     3,271,756
METHOD AND APPARATUS FOR DETECTING A HAZARDOUS CONDITION
Filed March 22, 1960     2 Sheets-Sheet 1

INVENTORS
Robert B. P. Crawford
Donese B. Tackett
BY
ATTORNEY

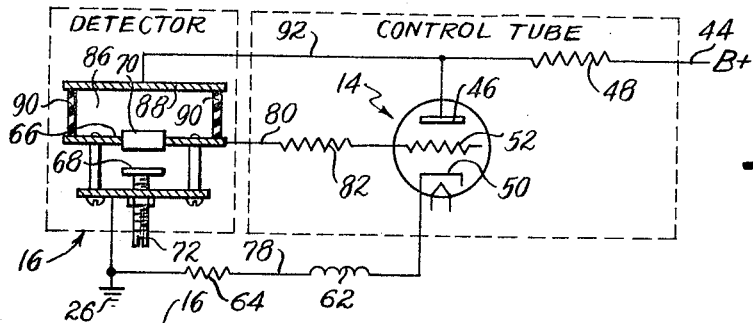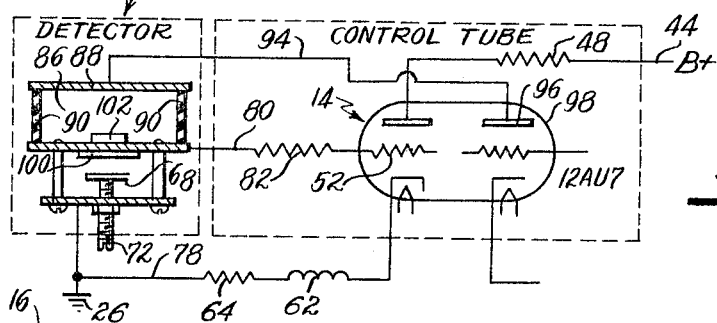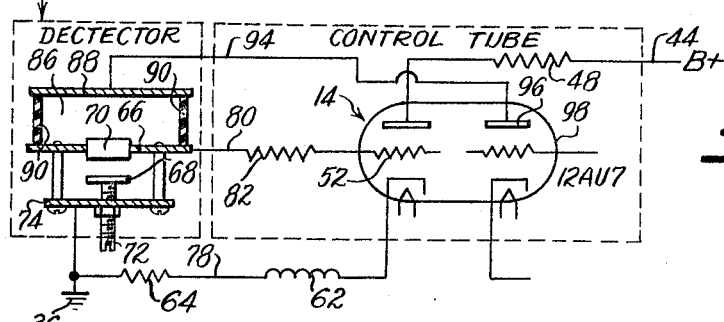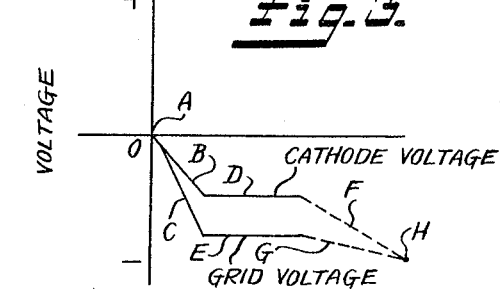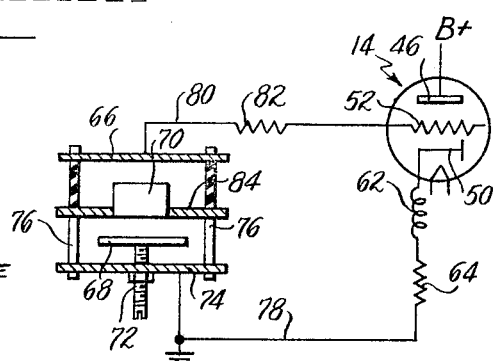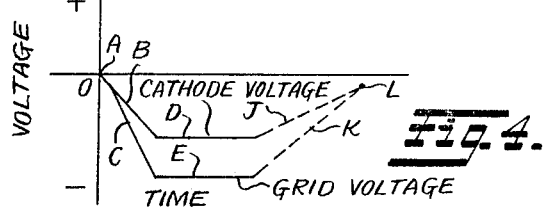

United States Patent Office 3,271,756
Patented Sept. 6, 1966

3,271,756
METHOD AND APPARATUS FOR DETECTING A HAZARDOUS CONDITION
Robert B. P. Crawford, Rosemead, Calif., and Donese B. Tackett, Scottsdale, Ariz., assignors to Harold J. Burke, Lake Forest, Ill.
Filed Mar. 22, 1960, Ser. No. 16,827
8 Claims. (Cl. 340—237)

This invention relates to a method and apparatus for detection of hazards and more particularly to improved means for sensing smoke and other combustion products of a fire at an incipient or earlier stage.

Presently known and conventional systems for detecting fires are subject to many disadvantages. Those employing ionization chambers to detect combustion gases or smoke, for example, are generally complex and expensive particularly when large numbers are needed to cover a building, often require non standard 230 volts power instead of conventional 115 volts, use special components such as thyratrons of peculiar rather than standard design, are slow to operate so that fire extinction measures cannot be taken before the fire is well along and great damage has been done, and frequently give an erroneous indication of fire when none exists as when actuated by smog. Conventional systems employing chemicals for detecting specific gaseous products of fire and other systems for detecting temperature rise are subject to similar disadvantages plus others including problems of maintenance, calibration and replacements.

The present invention overcomes these disadvantages by employment of a unique hazard sensing device which when used to detect fires may take the form of a ray or particle emitting substance, such as radium, tritium or the like, placed between a pair of spaced collector plates which are in turn connected to the grid and cathode of a vacuum tube. At least one of the plates is preferably adjustable with respect to the ray or particle source so that the emitted rays or particles collected by the pair can be regulated to bias the tube to cut off when normal, non hazardous conditions exist. When however, the rate of flow of electrically charged rays or particles to the collector plates is either abruptly increased or decreased, for a period of about five seconds, due to fire hazard conditions in the environment, the potential difference between the collector plates, and hence the tube grid and cathode, will be reduced to permit the tube to conduct and signal an alarm. The described detector has been found to operate more quickly and more surely than conventional devices, and is not affected by slowly changing nonfire induced conditions, such as smog.

Accordingly, it is a prime object of the present invention to obviate the disadvantages of conventional fire alarm systems, as outlined above, by providing an improved hazard detector utilizing a ray or charged particle emitting material placed between ray or particle collecting plates in the guarded environment to establish a biasing potential to cut-off an electron discharge device under normal conditions and to reduce such biasing potential, under all dangerous abnormal environmental conditions, and thus remove the cut-off bias and signal the alarm.

It is another object of the invention to provide an improved method and apparatus for the earlier detection and indication of hazardous conditions so that, as in the case of fire, enough time is given by the warning to enable protective measures to be taken before any actual damage has been done.

It is a further object of the invention to provide a simple method and apparatus for the early indication of hazardous conditions whereby to reduce the cost of fabrication, installation and maintenance of the alarm system.

It is still another object of the invention to provide an improved method and apparatus for the early indication of an incipient fire which will be operated by all environmental changes caused thereby, such as combustion gases, temperature rise, smoke, light, heat and the like, but will not be operated by environmental changes not cause by fire, such as smog.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures.

In the drawing:

FIGURES 3 and 4 are explanatory diagrams charting examples of the developed collector voltages of the detector under different hazard conditions and which voltages are applied as grid bias for the control tube;

FIGURES 5, 6 and 7 are partial schematic diagrams showing other modifications of the detector and control tube; and FIGURE 8 is a diagram comparing operation curves of the present invention with those of conventional alarm systems.

Figure 1:
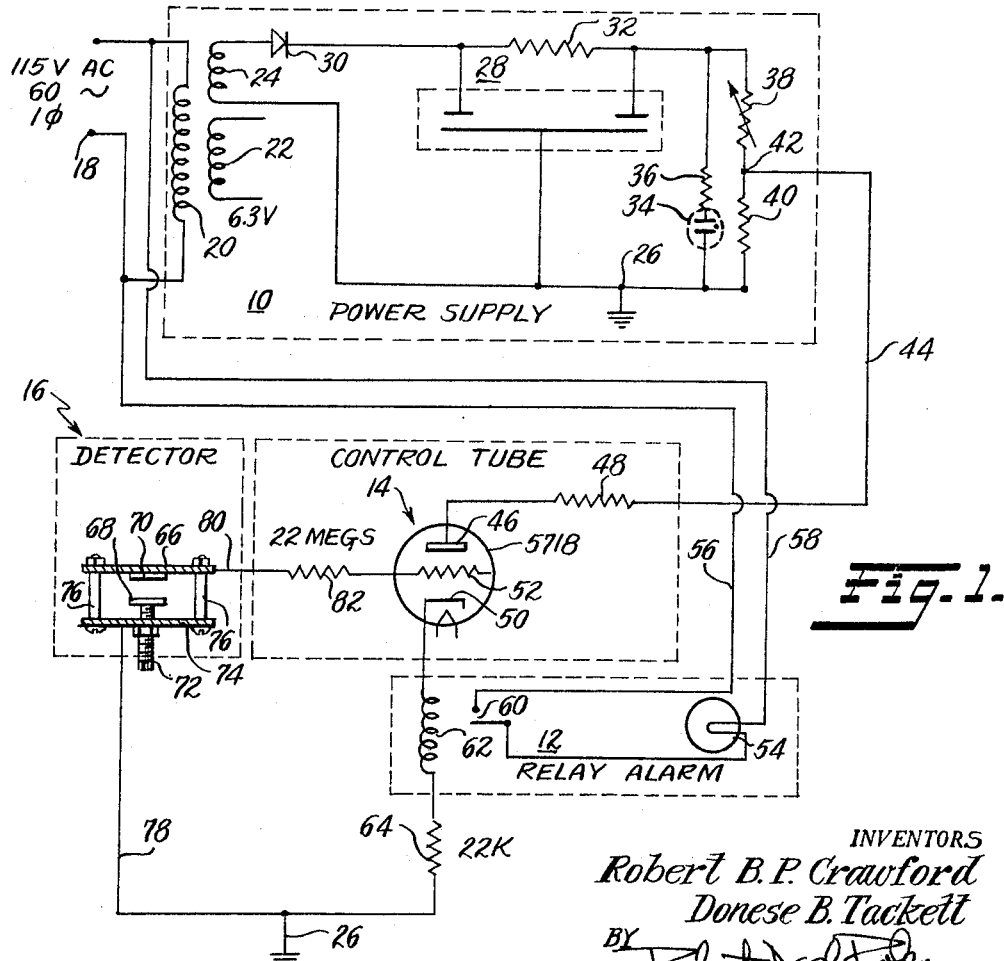
FIGURE 1 is a schematic circuit diagram of a fire alarm system showing a single detector and alarm unit according to a preferred embodiment of the invention.

The preferred embodiment of the invention, as illustrated more particularly in FIG. 1, comprises a power supply 10, an alarm 12, a control tube or electron discharge device 14 and a hazard detector 16.

The power supply 10 includes a conventional A.C. source connection 18 across which is connected a transformer primary 20. The primary is inductively coupled to transformer secondaries 22 and 24. The secondary 22 provides filament voltage of approximately 6.3 volts to the filaments of all the control tubes used in a system, only one of which is shown. The secondary 24 has one side connected to ground or reference point 26 and the other side to a filter network 28 through a diode rectifier 30. The diode provides halfwave rectification and the filter network tends to smooth out the rectified components of the A.C. received from the transformer secondary 24. The filter comprises a resistor 32 bridging a pair of 20 mfd. condensers in series whose mid point is connected to ground. Across the output end of the filter resistor 32 and ground is connected a neon lamp 34 which includes a resistance element 36. The lamp 34 when in the ON condition indicates that the filter network 28 is producing sufficient D.C. output from the A.C. supplied by the A.C. source 18.

The output of the filter network is further connected to a potentiometer network 38, 40. From a center-tap 42 of the potentiometer, a connection 44 runs to an anode plate 46 of the tube 14 through a plate resistor 48. The power supply thus provides a D.C. potential, variable by means of the potentiometer 38, in the range of approximately 110–190 volts.

The control tube or electron discharge device 14 comprises a vacuum triode having characteristics which preferably cause it to conduct current between a cathode 50 and the anode 46 when a grid 52 is approximately at zero or is positive with respect to the cathode. Such a tube may be of the type 5718, the 12AU7 or others. When the tube 14 conducts, the current flowing in the cathode circuit is arranged to trigger the alarm 12.

The alarm comprises an indicating lamp 54 connected across the power source 18 by leads 56 and 58, the lamp 54 circuit being normally open at relay contacts 60. A relay coil 62 is inserted in the cathode circuit of the control lamp in series to ground 26 with a resistor 64. The flow of approximately two and one half mils of current is sufficient to close the relay contacts 60 and light the indicating lamp 54.

For control of the grid bias of tube 14 so as to keep the tube in non-conducting condition except upon occurrence of a fire hazard, there is provided in the detector 16 a pair of spaced collector plates 66 and 68 between which is positioned a source of material 70 for emitting electric charge carrying or inducing rays or particles. Such material may be radium which releases alpha, beta and gamma rays or particles. Preferably the material is tritium which is absorbed in a suitable sponge material and releases beta particles only which are not harmful to persons or things in the guarded area. The collector 68 is preferably mounted on an adjusting screw 72 by means of which it may be moved relative to a support plate 74 and toward and away from the charged ray or particle source 70. This adjustability enables setting of a desired grid bias to cut-off the tube 14 under normal, non-hazardous conditions. The plates 66 and 74 may be formed of stainless steel or other suitable conducting metal and are spaced apart by insulating posts 76 leaving the space between the plates and surrounding the radioactive material 70 free and open to air circulation. The collector 68 may be a metal disc but good results have been obtained by forming it of an electro-conductive plastic material. The disc 68 is electrically connected to the tube cathode 50 through the adjusting screw 72, plate 74, wire 78, resistor 64 and relay coil 62. The collector plate 66 is electrically connected to the tube grid 52 by means of wire 80 and a high value resistor 82. Thus when the tube 14 is not conducting the grid 52 and the cathode 50 respectively take the potentials of the collector 66 and 68 in the detector 16.

The alarm apparatus described above has been experimentally observed to function extremely efficiently as a very sensitive detector for a hazard such as fire in its earliest stages. The emission of negatively charged rays or particles collected on the plates 66 and 68 bias the tube grid 52 to cut-off under normal, slowly changing and rapid transient changes. However, any abrupt change in the beta ray or particle flow from the source 70 to the collectors, whether it accelerates or decelerates the flow and if continuous for a short period of time, for example, five seconds, will cause the difference of potentials of the tube grid and cathode to decrease to a value which enables the tube to conduct and signal the alarm. The exact reason for this decrease is not fully understood but the electrical potential on the collectors slowly dissipates as time increases. This dissipation of the electrical potential may be due to current leakage through the atmosphere between the collectors, current leakage through the insulators separating the collectors, current leakage through the vacuum tube, or, as is most likely, a combination of all of the above causes.

Figure 2:
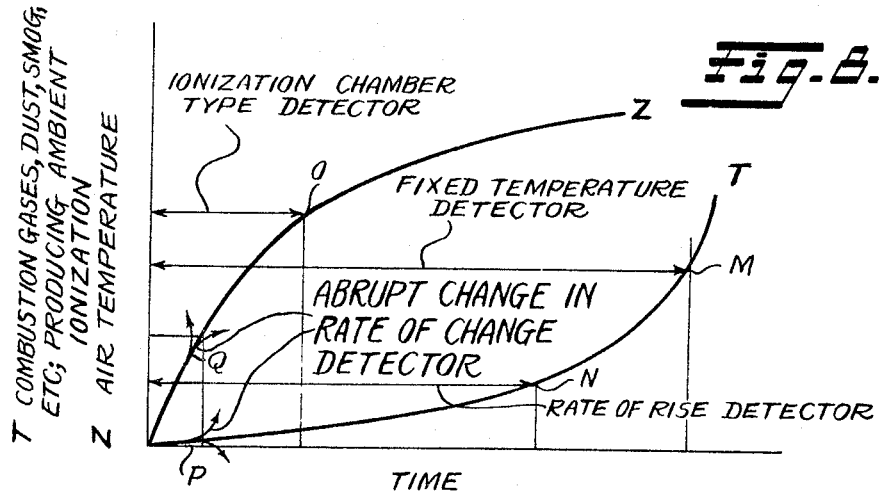
FIGURE 2 is a fragmentary schematic diagram showing a modified detector with its connections.

The reasons for the described operation, as best understood, may be more readily ascertained by reference to FIGS. 2–4 of the drawing. In FIG. 2 a modification is shown in which the ray or particle emitting source 70 is spaced slightly away from the collector 66 (shown exaggerated) and supported in such position in the opening of an insulating washer 84 mounted on posts 76. Before insertion of the ray or particle emitting source 70 into the described position, the potentials of collectors 66 and 68 would both be zero, as shown in FIG. 3 at point A. Introduction of the source 70, which is emitting electrons at a uniform rate, causes both the plates 66 and 68 to go negative due to the collection or absorption of electrons. In other words, with passage of time both of the plates 66 and 68 will become electrostatically charged. However, the collector plate 66 will absorb electrons more rapidly than the plate 68 due to its proximity, relative size and shape, etc. This is figuratively shown at B and C, FIG. 3. Under normal atmospheric or environmental conditions the collector potentials will level off at small negative values indicated by reference letters D and E, FIG. 3, because the continued absorption of electrons will be offset by dielectric leakages occurring in the detector, along the connecting leads and within the tube 14. At this time the plate 66, and consequently the tube grid 52, will be slightly more negative than the plate 68 or the tube cathode 50. The tube is therefore cut-off and no alarm is indicated.

If an abrupt change should now occur in the environment which tends to increase the rate of electron flow to and absorption by the collector plates, as for example reduced air density caused by elevated temperature, lower pressure, formation of lighter combustion gaseous products or the like, the potential of the collector 68 will go further negative more rapidly as shown at F, FIG. 3, than the potential of the plate 66 as shown at G, FIG. 3. This is because of the constant emission rate of the electrons and the closeness to the source of the collector 66. This collector, before the change, is absorbing electrons at nearly the maximum possible rate, the matter in the small air space offering very little impedance to the flow. Thus when the source 70 actually contacts the plate 66, as in FIG. 1, the latter is collecting electrons at the maximum possible rate and in such instance the curve portion G of FIG. 3 would remain horizontal at the same potential. If the change in environmental conditions is abrupt and continues for a short period of time, such as five seconds, curve portions F and G will intersect, or nearly so, at point H. When this condition occurs, the tube 14 will conduct and signal the alarm.

FIG. 4 illustrates the change in grid and cathode potentials occuring when the detector environment abruptly changes in a way to decrease the rate of electron flow to and absorption by the collector plates. Such change may be caused by the presence of heavier or denser combustion products, ionized gases, smoke and the like. The denser atmosphere impedes the rate of passage of electrons to the collector plates and both tend to go more positive, as shown at J and K, FIG. 4. Because the cathode connected plate 68, under normal conditions, being further spaced from the source 70, is considerably affected by failures of electrons to reach the collector due to collisions and neutralization within the air space, this collector will be less affected by increased density of the environment. As a result the collector 66, connected to the grid, will go less negative more rapidly than the collector 68 and the tube cathode. This result is augmented by the presence of ionized molecules or particles either arriving in the detector from outside or formed therein by collisions of the rays with molecular particles. The positive ions nearer the source 70 are attracted to its negative surface thus reducing its emission rate and in effect reducing its capacity to charge the collectors 66 and 68 with negative potentials. Thus both the slowing of electrons passage and the reduction of emissivity of the source 70 cause the grid and cathode potentials to go more positive with the grid potential moving at a faster rate until after a short elapsed period the voltage curve portions J and K intersect as at L, and again the tube conducts and signals an alarm. The point L usually occurs at zero potential or very slightly negative.

The operation of the embodiment of FIG. 1 in which the ray source 70 is positioned in contact with and supported by the collector 66 is substantially identical with that of the embodiment shown in FIG. 2 and described above.

FIG. 5 shows a modified embodiment of the invention in which a closed chamber 86 is added adjacent the collector 66 and the ray source 70 extends partially into such chamber. The chamber is enclosed by side walls 90 of insulating material and a metal top plate 88 connected by lead 92 to the tube anode 46. In all other respects the alarm device is the same as depicted in FIG. 1. The device of FIG. 5 operates in the same manner as described for the embodiments of FIGS. 1 and 2, except that the emission of rays or particle from source 70 toward the plate 88 may ionize the entrapped air and draw a very small flow of negative ions as well as beta rays to plate 88. This effect, constant because the chamber is closed to entry of outside air, together with the conduction of electrons from the source 70 to the collector 66 applies a fixed negative reference level to the collector and the grid 52 which insures that the grid will normally remain negative even when the grid bias approaches zero. Since the relative potentials of the grid and cathode are controlled by those of the detector plates 66 and 68 and these are affected by leakage and capacitive losses between the detector plates, along the leads and by the interelectrode capacitance values of the tube 14, the dimensions and geometry of both the detector and the tube are important. The addition of the chamber 86 and the grid-anode capacity of the tube 14 forms a bridge like circuit which under certain conditions improves the operation of the hazard detector.

The modified versions of the invention shown in FIGS. 6 and 7 are similar in construction and operation to those previously described. In both instances a double triode type 12AU7, part 98, has been substituted for the triode type 5718. The left triode in each tube is utilized to trigger the alarm, not shown, by control of the grid bias exercized by the detector. The third collector 88 adjacent the reference chamber 86 is connected by lead 94 to inoperative anode 96 of the right triode in tube 98. Thus the circuit to the detector is completed through the capacitance between the anode 96 and the grid 52. In FIG. 6 two separate ray sources 100 and 102 are used, one positioned below and contacting the collector 66 and the second above and also in contact therewith. Preferably the source 100 is stronger, about 8 microcuries while the source 102 may be approximately 2 microcuries. In FIG. 7 the single source 70 of about 8 microcuries projecting partially into the reference chamber 86 is again used.

FIGURE 8 is a diagrammatic sketch comparing the operation of conventional fire alarms with the present invention. It will be noted that the conventional fixed temperature sensitive detector is slowest operating at point M on curve T. The rate of temperature rise sensitive detector is slightly faster operating at point N on the curve T. The ionization detector is considerably faster operating at point O on curve Z. The present invention is by far the fastest, operating at points P and Q on the curve T and Z respectively with abrupt changes in the rate of change of temperature and ionization as indicated by the arrows appended to the curves T and Z.

It is apparent that any undesirable hazardous condition occuring in an environment subjects the passage, collection or absorption of beta rays or particles to an abrupt rate of change and, hence, it is believed that the improved detection apparatus and the method of detecing such undesirable hazardous conditions, as described and disclosed herein, are operable in what may be considered as an unlimited number of environments.

Many changes, substitutes and equivalents to the described construction will present themselves to those skilled in the art. For example different radioactive materials and grid controlled tubes may be substituted. Transistors, semiconductors and other tube substitutes may be used in place of the vacuum triode, and the alarm may be triggered by conduction in the anode rather than the cathode circuit. Therefore, it should be understood that while the invention has been described and disclosed in terms of embodiments which it may assume in practice, the scope of the invention should not be deemed to be limited by the precise embodiments herein shown, illustrated, disclosed and described and that such other embodiments which the invention may assume are intended to be reserved especially as they fall within the scope of the claims herein appended.

We claim as our invention:

1. A hazardous condition detector comprising:
    a pair of charged particle collectors separated to define a space open to the atmosphere of a selected environment,
    a source of charged particle emitting material positioned in said space closer to one than the other of said pair of charged particle collectors to produce a greater electrical potential on said one of said pair of charged particle collectors and a smaller electrical potential on said other of said pair of charged particle collectors,
    said pair of particle collectors being charged only by the source of charged particle emitting material and being the sole biasing potential for an electron discharge device to enable the relative difference between said greater electrical potential and said said smaller electrical potential to be dependent upon the environmental atmosphere in said space,
    electrical potential dissipating means operatively associated with said pair of charged particle collectors whereby under normal environmental conditions the relative electrical potentials on said pair of charged particle collectors will remain substantially constant and rapid variations in the environmental atmosphere in said space will modify the relative electrical potentials on said pair of charge particle collectors, and
    means for connecting the pair of charged particle collectors to the electron discharge device to enable said biasing potential to provide a cut-off bias to the discharge device under normal environmental conditions and to provide less than a cut-off bias thereto under rapidly changing environmental conditions and cause said electron discharge device to conduct and signal an alarm.

2. The hazardous condition detector according to claim 1, together with means for varying the spacing of said charged particle collectors to enable initial setting of a desired cut-off bias potential.

3. The hazardous condition detector according to claim 1 wherein said source of charged particle emitting material is positioned in contact with and secured directly to said one of said pair of charged particle collectors.

4. The hazardous condition detector according to claim 3 wherein:
    said electron discharge device comprises a vacuum tube having a cathode and a control grid, and
    said means for connecting the charged particle collectors to the electron discharge device comprises
    means for connecting said one of said pair of charged particle collectors to said control grid and
    means for connecting said other of said pair of charged particle collectors to said cathode.

5. The hazardous condition detector according to claim 4 wherein:
    an alarm relay coil is provided in the cathode circuit of said vacuum tube whereby an alarm is actuated upon conduction of the vacuum tube and flow of current in the cathode circuit thereof.

6. A hazardous condition detector according to claim 1 further comprising:
    a third charged particle collector disposed in spaced relationship to the one of the said pair of charged particle collectors to define therewith a reference chamber therebetween,
    said reference chamber being closed to the environmental atmosphere,
    said third charged particle collector being in electrical communication with a potential free anode of the electronic discharge device, and a second source of charged particle emitting material in said reference chamber for producing reference potentials on said one and said third charged particle collectors, said third charged particle collector being charged only by the second source of charged particle emitting material.

7. The hazardous condition detector according to claim 6 together with means for varying the spacing of said pair of charged particle collectors to enable initial setting of a desired cut-off bias potential.

8. The hazardous condition detector according to claim 6 wherein said reference chamber is adjacent said one collector of the pair of charged particle collectors and said first mentioned source of charged particle emitting material and said second source of charged particle emitting material are combined and disposed partially in said reference chamber and partially in said open space.

References Cited by the Examiner

UNITED STATES PATENTS

| | | | |
|---|---|---|---|
| 2,145,866 | 2/1939 | Failla | 250—83.6 |
| 2,395,623 | 2/1946 | Goldstein et al. | |
| 2,408,051 | 9/1946 | Donelian | 340—237 |
| 2,465,377 | 3/1949 | Jaeger | 315—156 |
| 2,646,556 | 7/1953 | Allen | 340—213 |
| 2,702,898 | 2/1955 | Meili | 340—237 |
| 2,759,174 | 8/1956 | Brailsford | 340—237 |
| 2,763,789 | 9/1956 | Ohmart | 250—83.3 X |
| 2,763,790 | 9/1956 | Ohmart | 250—83.4 |
| 2,801,389 | 7/1957 | Linder. | |
| 2,809,317 | 10/1957 | Meili | 340—237 X |
| 2,818,509 | 12/1957 | Johnston | 250—83.6 |

FOREIGN PATENTS

| | | |
|---|---|---|
| 398,722 | 9/1933 | Great Britain. |
| 536,594 | 5/1941 | Great Britain. |

NEIL C. READ, *Primary Examiner.*

BENNETT G. MILLER, STEPHEN W. CAPELLI,
*Examiners.*

D. K. MYER, *Assistant Examiner.*